United States Patent
Taylor et al.

(10) Patent No.: US 10,917,758 B1
(45) Date of Patent: *Feb. 9, 2021

(54) VOICE-BASED MESSAGING

(71) Applicant: Amazon Technologies, Inc., Seattle, WA (US)

(72) Inventors: Brandon Taylor, Seattle, WA (US); Gaurav Singh, Chennai (IN); Reza Abdollahi, Redmond, WA (US); Mugunthan Govindaraju, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,734

(22) Filed: May 24, 2018

Related U.S. Application Data

(63) Continuation of application No. 15/633,130, filed on Jun. 26, 2017, now Pat. No. 9,986,394.

(51) Int. Cl.
  *H04W 4/14* (2009.01)
  *H04W 4/18* (2009.01)
  *G10L 15/26* (2006.01)
  *H04W 88/18* (2009.01)

(52) U.S. Cl.
  CPC ............ *H04W 4/14* (2013.01); *G10L 15/26* (2013.01); *H04W 4/18* (2013.01); *H04W 88/184* (2013.01)

(58) Field of Classification Search
  CPC ...................................................... H04W 4/14

USPC ........................................................ 455/466
See application file for complete search history.

(56) References Cited

U.S. PATENT DOCUMENTS

| | | | |
|---|---|---|---|
| 9,230,549 B1* | 1/2016 | Popik | H04L 51/36 |
| 2004/0017788 A1* | 1/2004 | Shmueli | H04L 29/06027 |
| | | | 370/328 |
| 2008/0062253 A1* | 3/2008 | Jaspersohn | H04M 7/0072 |
| | | | 348/14.11 |
| 2012/0201362 A1* | 8/2012 | Crossan | G10L 15/26 |
| | | | 379/88.01 |
| 2014/0040445 A1* | 2/2014 | Beckert | H04L 67/2823 |
| | | | 709/223 |
| 2017/0263147 A1* | 9/2017 | King | G09B 5/02 |

* cited by examiner

*Primary Examiner* — Joel Ajayi
(74) *Attorney, Agent, or Firm* — Pierce Atwood LLP

(57) ABSTRACT

Techniques for enabling a system to create a multimedia messaging service (MMS) message or a short message service (SMS) message from a spoken message are described. A system may receive audio data corresponding to a spoken message. The system may determine a recipient of the spoken message as well as a device associated with the recipient. The system may determine the type of messaging supported by the device. Based on the messaging capabilities, the system generates either a MMS message or a SMS message. The MMS message may include a message payload including a portion of text corresponding to content of the message as well as audio data embedded in the message payload. The SMS message may include a message payload including a portion of text corresponding to content of the message as well as a link to message content audio data stored by the system.

20 Claims, 18 Drawing Sheets

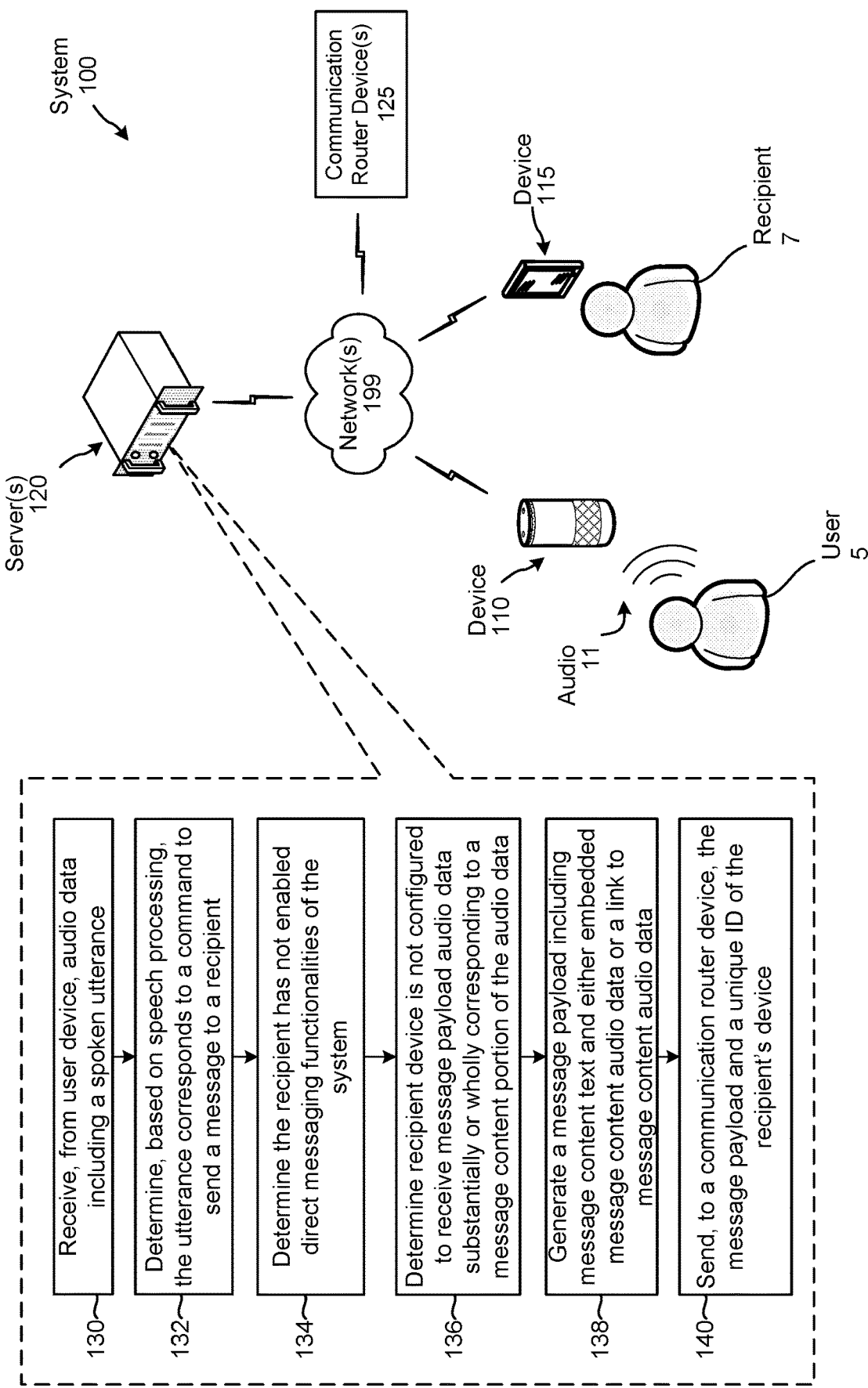

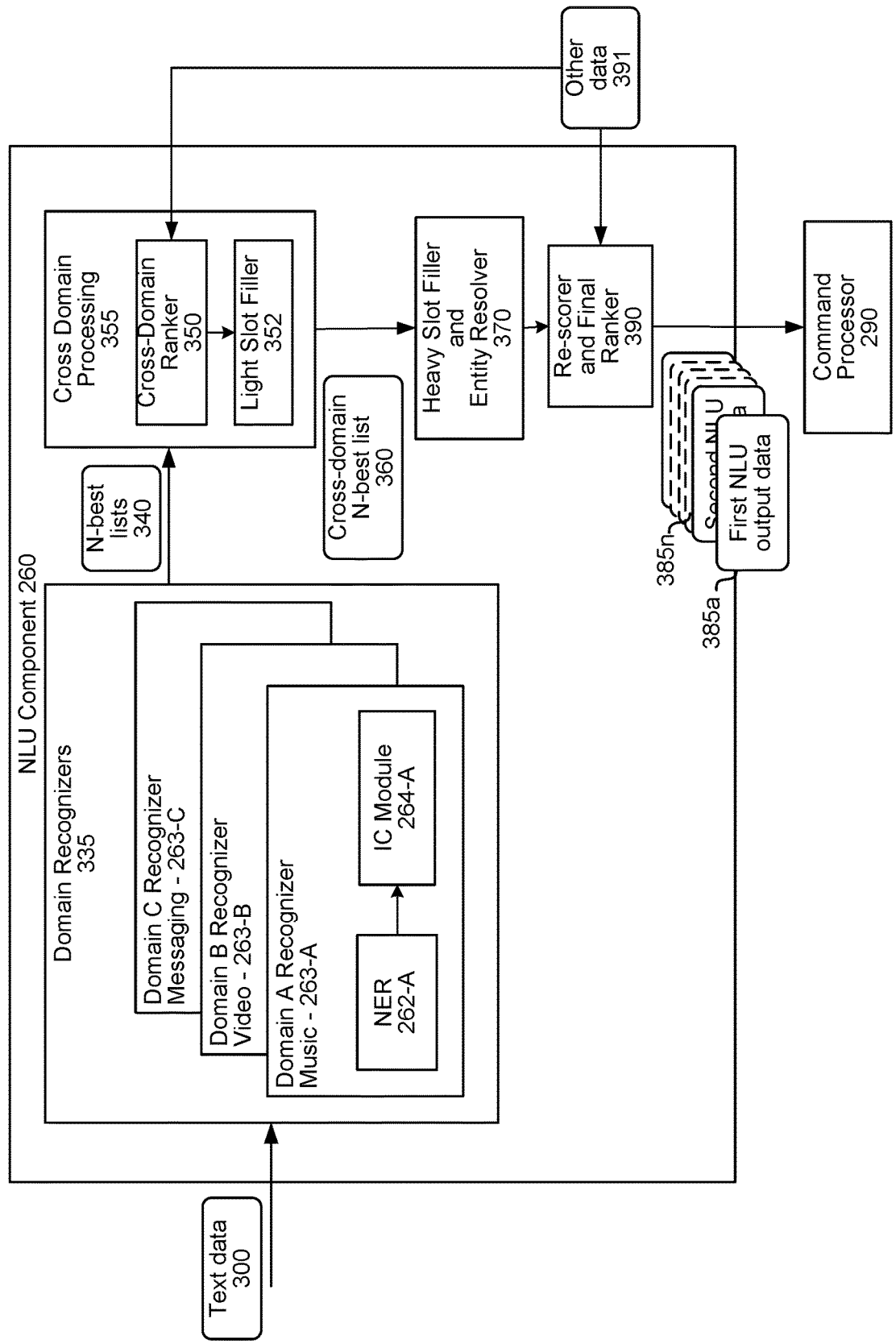

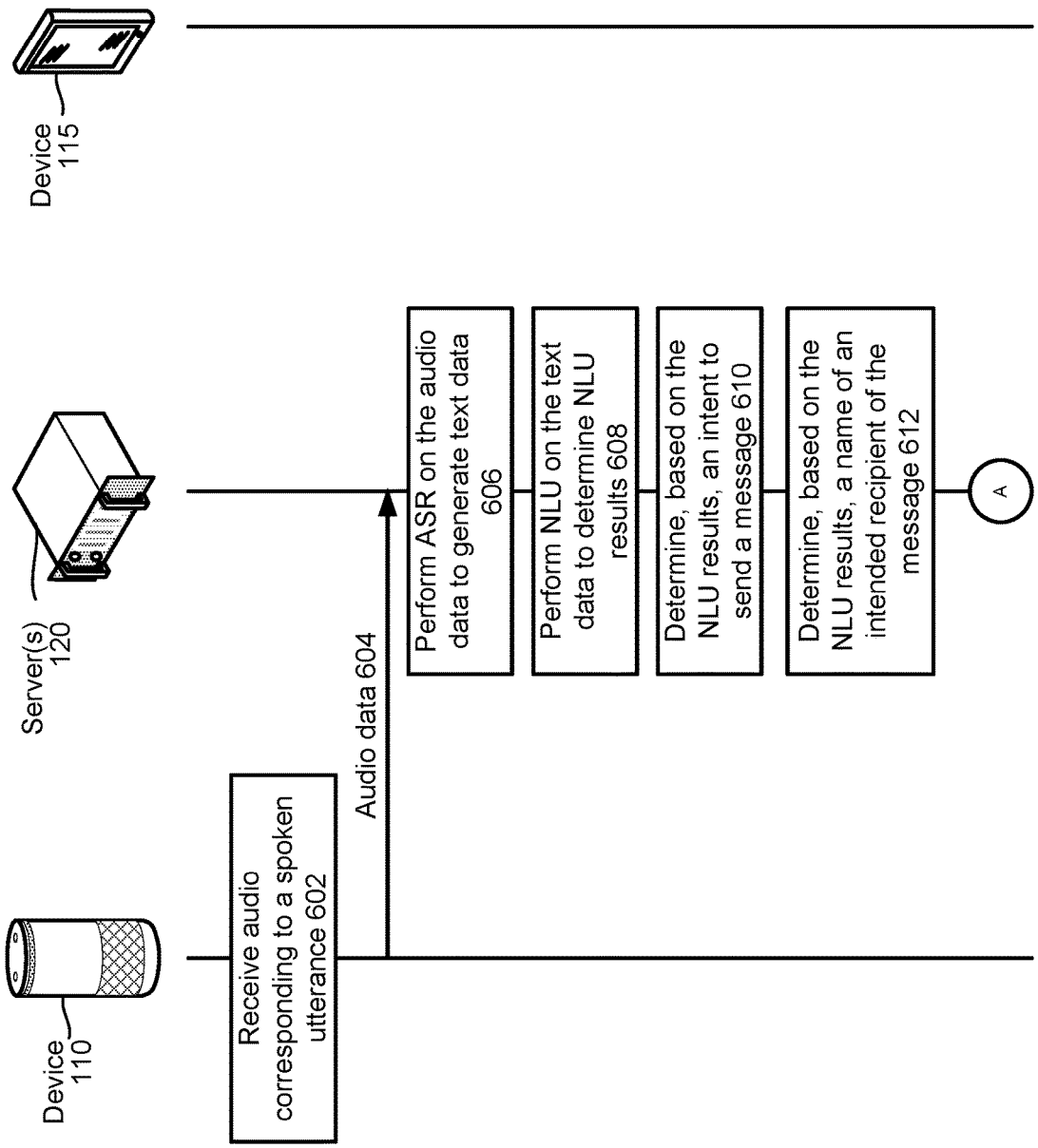

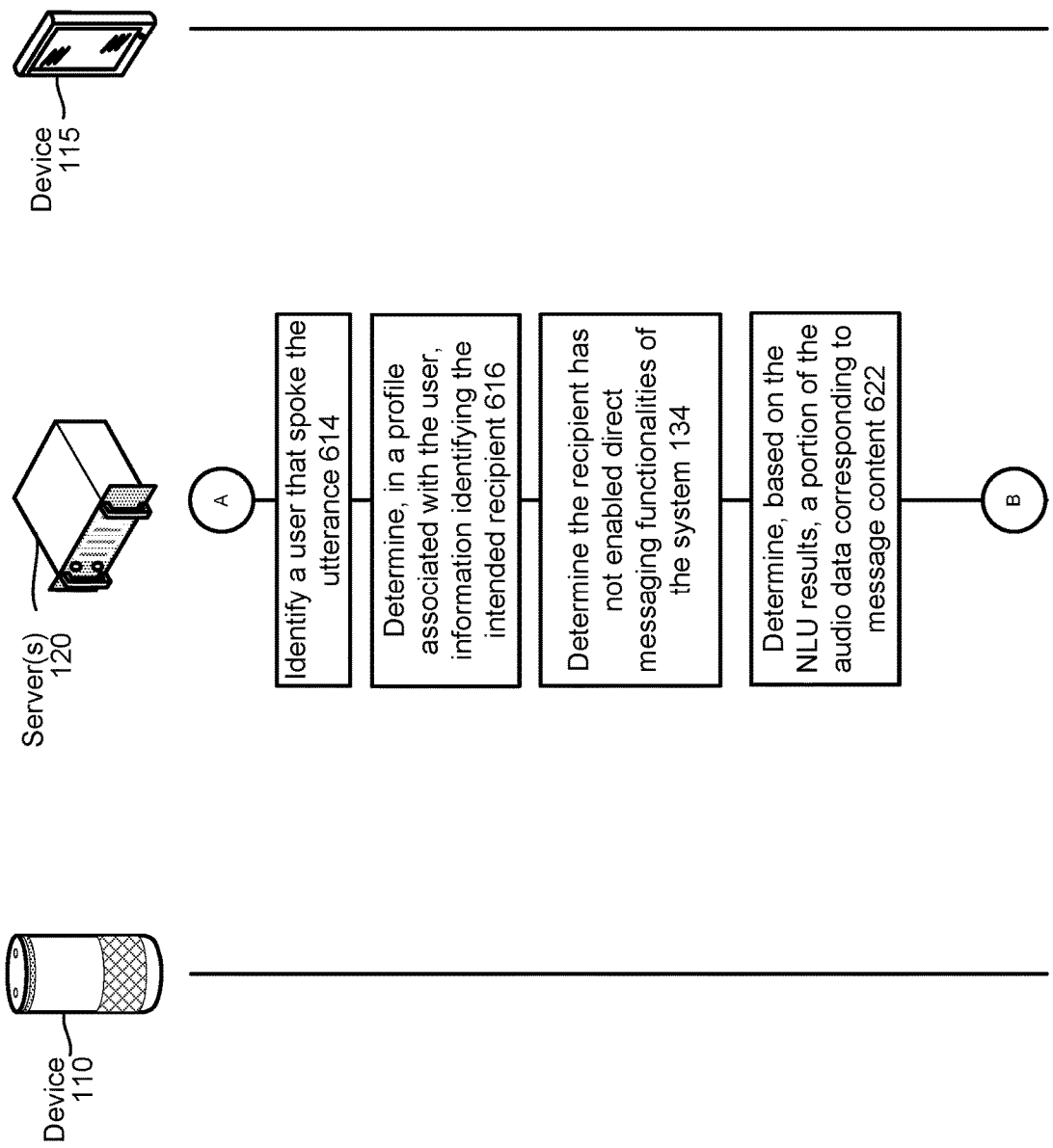

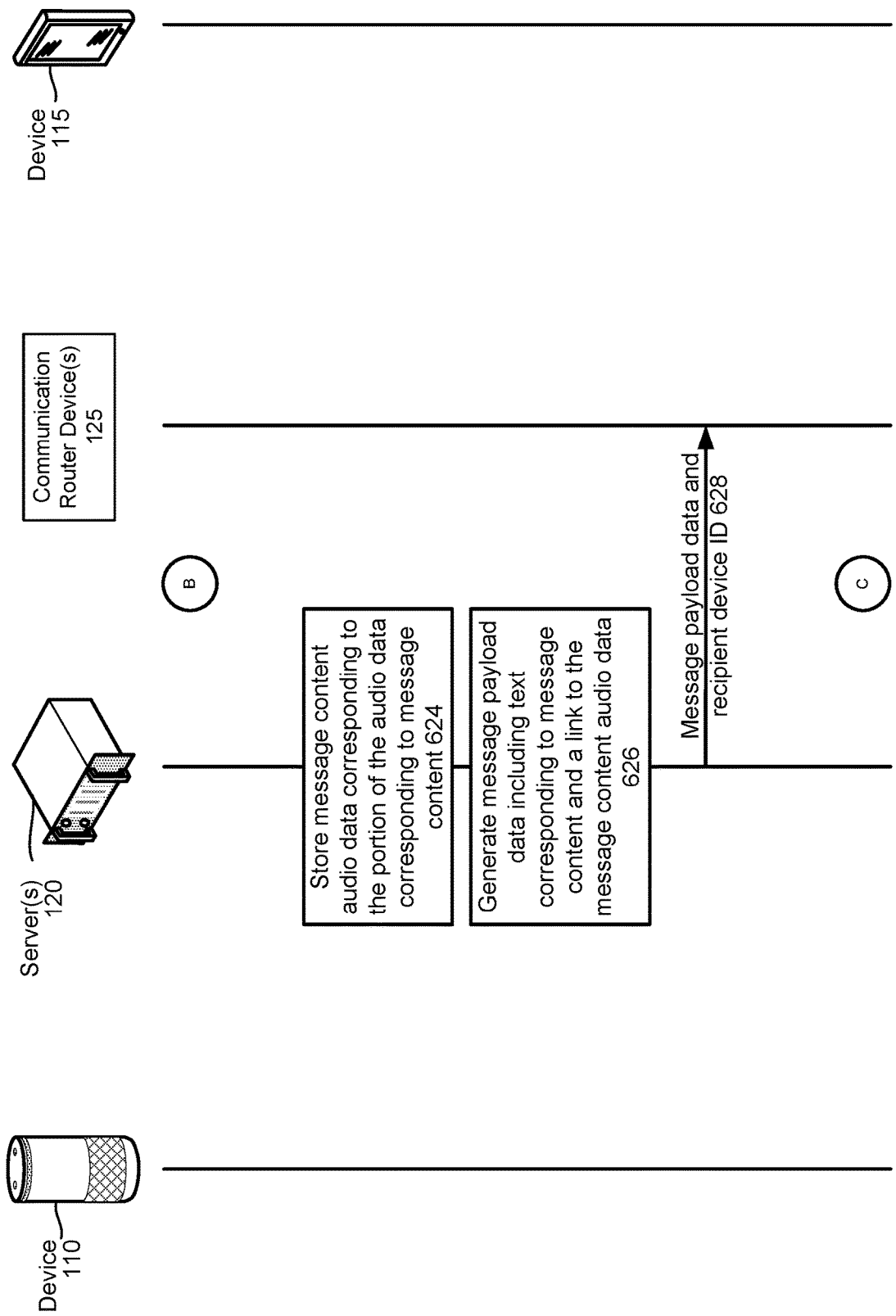

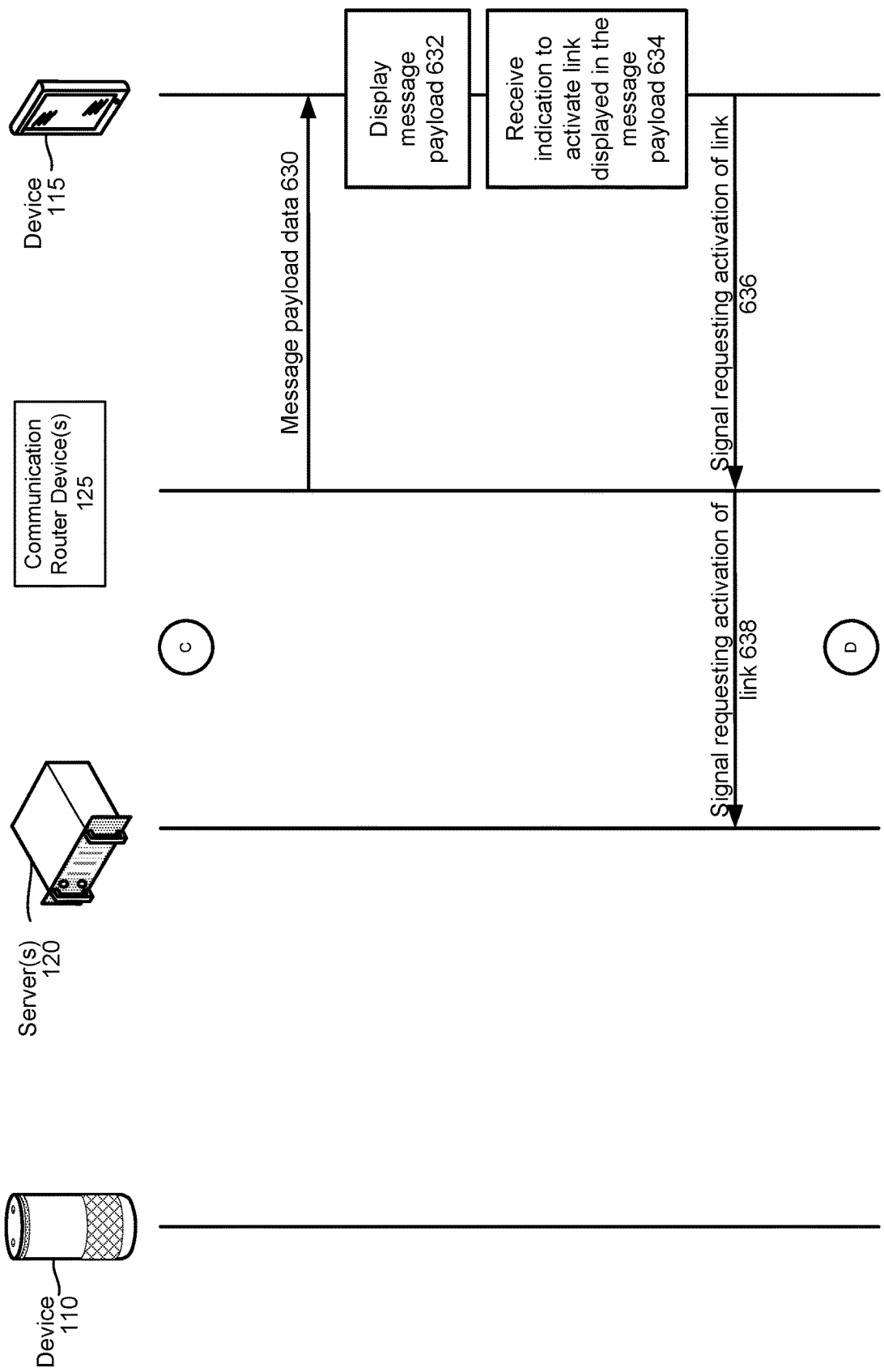

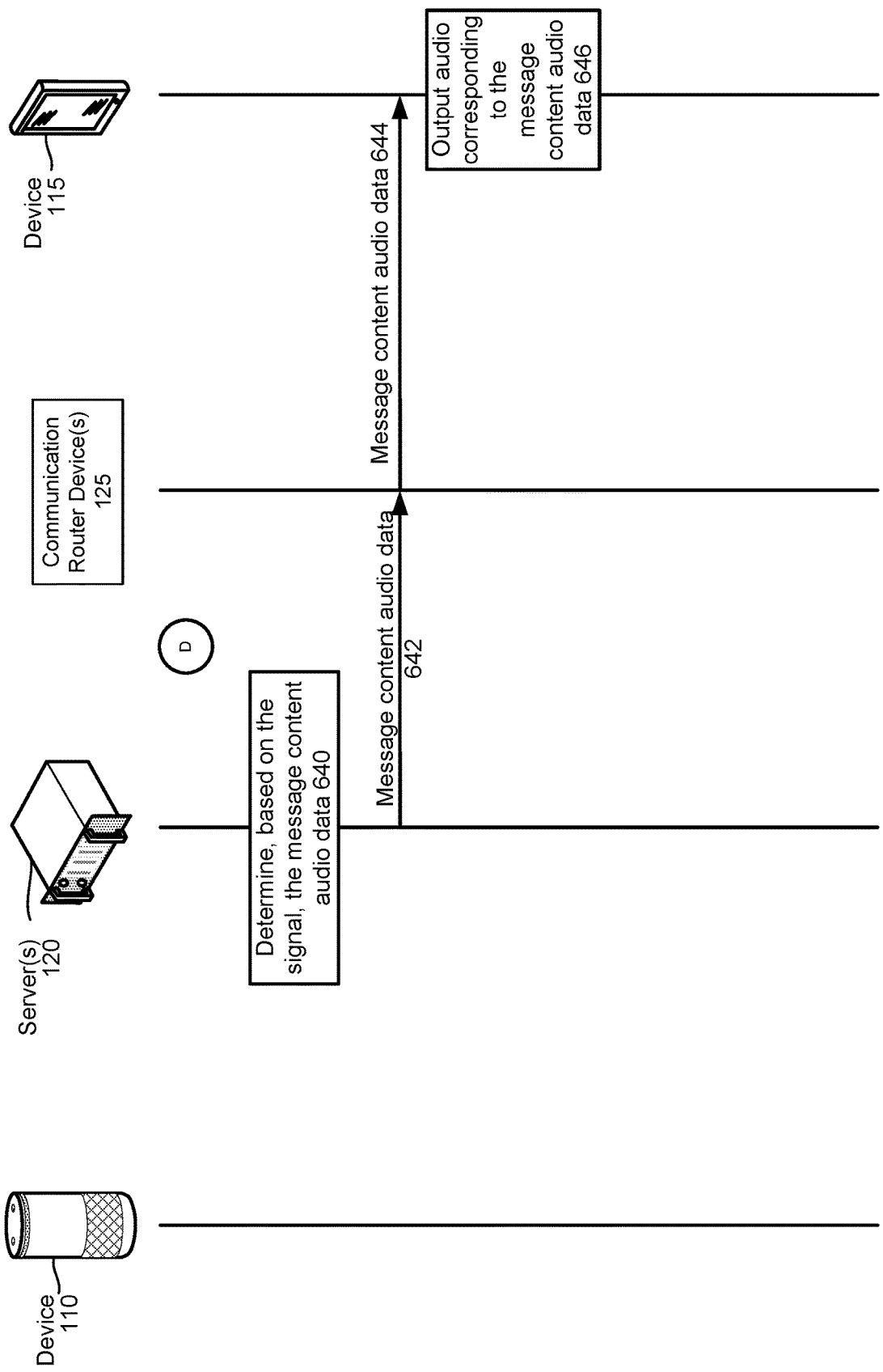

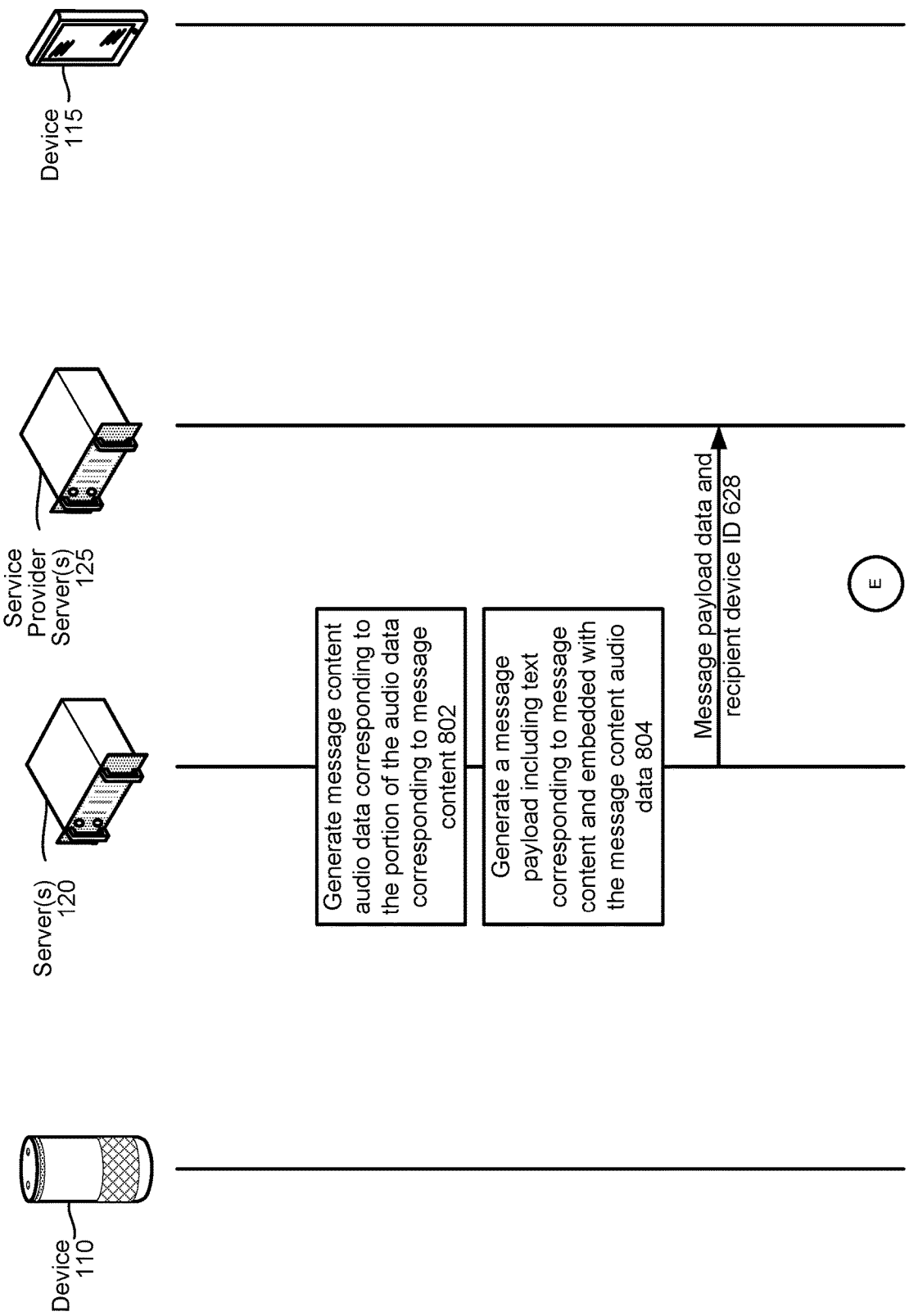

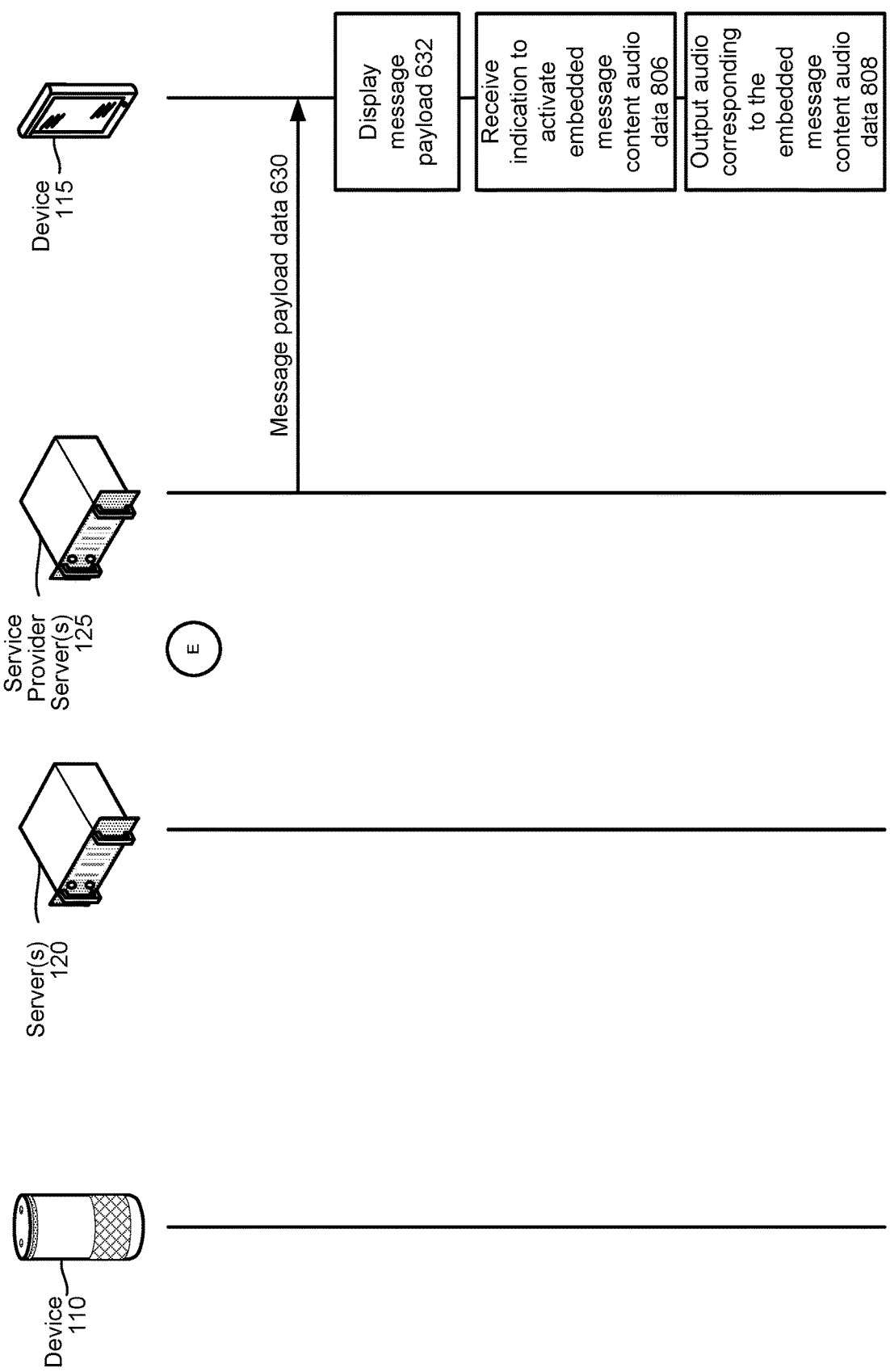

VOICE-BASED MESSAGING

CROSS REFERENCE TO RELATED APPLICATION

This application is a continuation of, and claims the benefit of priority of, U.S. Non-provisional patent application Ser. No. 15/633,130, filed Jun. 26, 2017 and entitled "VOICE-BASED MESSAGING," in the names of Brandon Taylor, et al., which is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to generate message payloads including either embedded message content audio data or a link to message audio data according to embodiments of the present disclosure.

FIG. 3 is a conceptual diagram of a system architecture for parsing incoming utterances using multiple domains according to embodiments of the present disclosure.

FIGS. 6A through 6E are a signal flow diagram illustrating the generation of a message payload including a link to message content audio data according to embodiments of the present disclosure.

FIGS. 8A and 8B are a signal flow diagram illustrating the generation of a message payload including embedded message content audio data according to embodiments of the present disclosure.

DETAILED DESCRIPTION

Figure 1B:
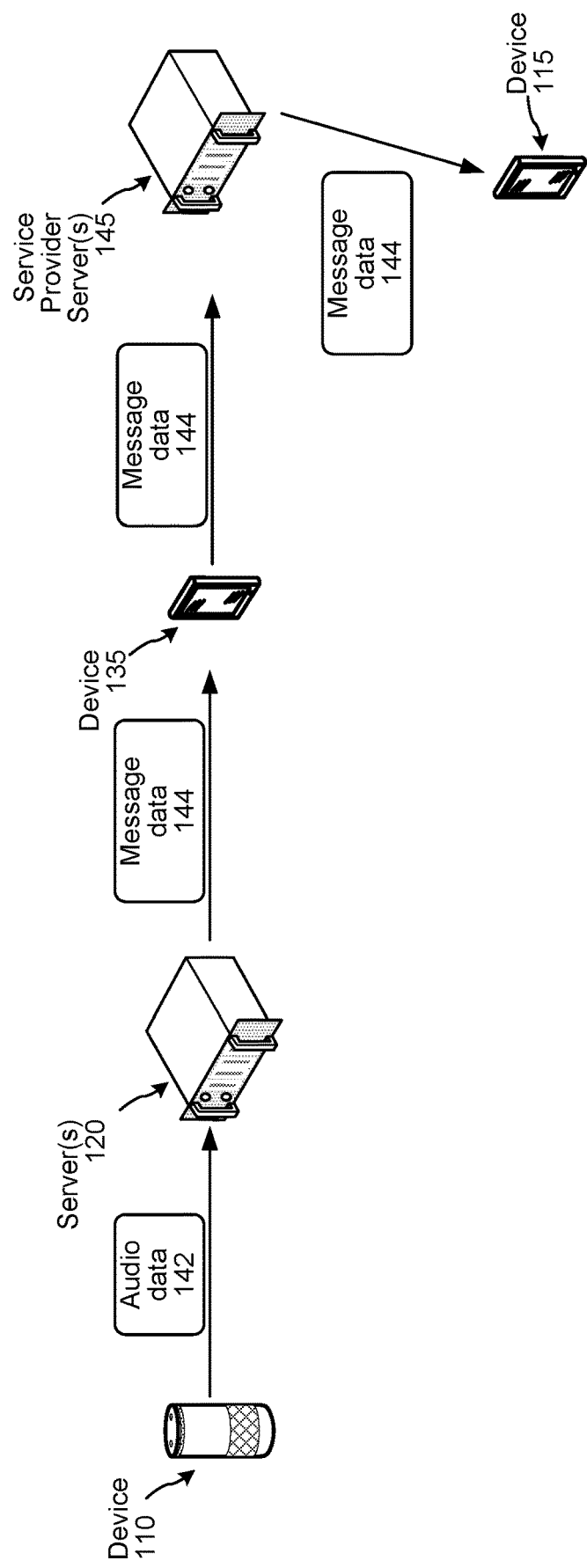
FIG. 1B is a system flow diagram illustrating the transmission of a message according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. ASR, NLU may be used together as part of a speech processing system.

A user may speak content of a message to a device that is part of a speech processing system configured to execute one or more commands corresponding to input speech. For example, the device may capture audio corresponding to "send a message to John and tell him I am looking forward to having coffee with him," "tell john I said hi," or the like. The system may create a message payload corresponding solely to audio data representing content of the spoken message. The system sends the message payload to the recipient's device. The recipient device may output an indication that the message payload was received and, in response to receiving a user indication to output the message, may output audio corresponding to the message payload.

The present disclosure expands the aforementioned messaging capabilities by enabling a system to create a multimedia messaging service (MMS) message or a short message service (SMS) message from a spoken message to make the audio of the spoken message accessible to the message recipient. A system may receive audio data corresponding to a spoken message. The system may determine a recipient of the spoken message as well as identify a device associated with the recipient. The system may determine the type of messaging supported by the device (e.g., whether the device can receive an audio message for playback or is configured to receive more traditional text-based messages). The messaging supported by the device may be determined by the capabilities of the device and/or the capabilities of a telephony and messaging service provider associated with the device. Based on the determined messaging capabilities of the intended recipient device, the system generates either a message including embedded audio data corresponding to at least a message content portion of the originally spoken message or a message including a link to audio data corresponding to at least a message content portion of the originally spoken message. The link may be a hypertext transfer protocol (HTT) link, a hypertext markup language (HTML) link, an extensible markup language (XML) link, or the like. In this way the system can send the audio of a spoken message directly to a recipient device if it is configured to playback the audio or, if the recipient device is not configured to playback the audio, the system can send the recipient device a link to the audio of the spoken message.

In both cases the system can also optionally send text corresponding to the spoken message. The teachings of the present disclosure are beneficial because, for example, they enable a system to send message payloads corresponding to spoken messages even to devices that are not configured to receive purely audio data messages. The teachings of the present disclosure are also beneficial because they enable a user of a particular system to send voice-based message payloads to recipient devices that are not configured as part of the system (e.g., which are configured as part of a telephony and messaging service provider's system).

FIG. 1A shows a system 100 configured to generate message payloads including either embedded message content audio data or a link to message content audio data. Although the figures and discussion illustrate certain operational steps of the system 100 in a particular order, the steps described may be performed in a different order (as well as certain steps removed or added) without departing from the intent of the disclosure. As shown in FIG. 1A, a device(s) 110 local to a user 5, a server(s) 120, a communication router device 125, and a recipient device 115 local to a recipient 7 may be in communication over one or more networks 199. The server(s) 120 (which may be one or more different physical devices) may be capable of performing traditional speech processing (e.g., ASR, NLU, command processing, etc.) as well as other operations as described herein. A single server 120 may perform all speech processing or multiple servers 120 may combine to perform all speech processing. Further, the server(s) 120 may execute certain commands, such as answering spoken utterances of users 5, sending messages of users 5, and operating other devices (e.g., light switches, appliances, etc.). In addition, certain speech detection or command execution functions may be performed by the speech-detection device(s) 110.

As shown in FIG. 1A, a device 110 may capture audio 11 including a spoken utterance of a user 5 via a microphone or microphone array of the device 110. The device 110 determines audio data corresponding to the captured audio 11, and sends the audio data to the server(s) 120 for processing.

The server(s) 120 receives (130) the audio data from the device 110. The server(s) 120 determines (132), based on speech processing (e.g., ASR and NLU) of the audio data, the utterance corresponds to a command to send a message to a recipient. The server(s) 120 determines (134) the recipient of the message has not enabled direct audio messaging functionalities of the system 100. That is, the recipient has not enabled a permission of the system 100 allowing the system 100 to send audio messages directed from a device 110 to the recipient's device via the server(s) 120. Such a determination may be based on failing to identify a system profile associated with the recipient. The determination may alternatively be based on identifying a system profile associated with the recipient, but determining the profile does not indicate direct audio messaging functionalities of the system 100 are enabled. In another example, the determination may be based on identifying a system profile associated with the recipient as well as determining the profile indicates direct audio messaging functionalities of the system are disabled.

The server(s) 120 may generate (138) a message payload including message content text (e.g., text output from ASR processing of the audio data and determined by NLU processing to correspond to message content) and either embedded message content audio data or a link to the message content audio data. The server(s) 120 may then send (140) the message payload and data indicating a unique identifier (ID) of the recipient's device (e.g., a phone number) to a communication router device(s) 125.

The communication router device 125 may be a mobile device (e.g., smart phone, tablet, laptop computer, etc.) of the user 5 that operates a companion application associated with the server(s) 120 and a SMS application, which may be associated with a service provider/carrier. The mobile device may receive the payload and unique ID from the server(s) 120 and may send the payload and unique ID to the SMS application via an application program interface (API) between the companion application and the SMS application. The SMS application may send the payload and unique ID to a server(s) controlled and/or operated by the service provider. The SMS application may generate a record of the payload being sent to the service provider server(s) and display such in a sent folder of the SMS application. The service provider server(s) may send the payload to a device 115 associated with the unique ID.

The communication router device 125 may alternatively be a service provider server(s). The server provider server(s) may receive the payload and unique ID from the server(s) 120 and may send the payload to a device 115 associated with the unique ID once the service provider server.

FIG. 1B further illustrates the system 100 illustrated in FIG. 1A. According to FIG. 1B, the device 110 receives audio corresponding to a spoken message and sends audio data 142 corresponding thereto to the server(s) 120. The server(s) 120 performs steps 130-138 described with respect to FIG. 1A. The server(s) 120 may then send message data 144 (including message payload data and a unique ID specific to an intended recipient's device) to a mobile computing device 135 associated with a profile of the user that spoke the original utterance corresponding to the message. Specifically, the server(s) 120 may send the message data 144 to a companion application executed by the device 135 and associated with the server(s) 120.

The message data 144 may include an application program interface (API) instruction specific to a service provider API located on the device 135. Based on the API instruction, the companion application may send the message data through the API to a SMS messaging application executed by the device 135. The SMS messaging application may then send the message data 144 (including the message payload data and the unique ID specific to the intended recipient's device) to a service provider server(s) 145 associated with the intended recipient's device. For example, the SMS messaging application may determine the service provider server(s) 145 associated with the intended recipient's device based on the unique ID specific to the intended recipient's device. The service provider server(s) 145 may route the message data 144, namely the message payload data contained therein, to the recipient's device 115 associated with the unique ID.

Figure 2A:
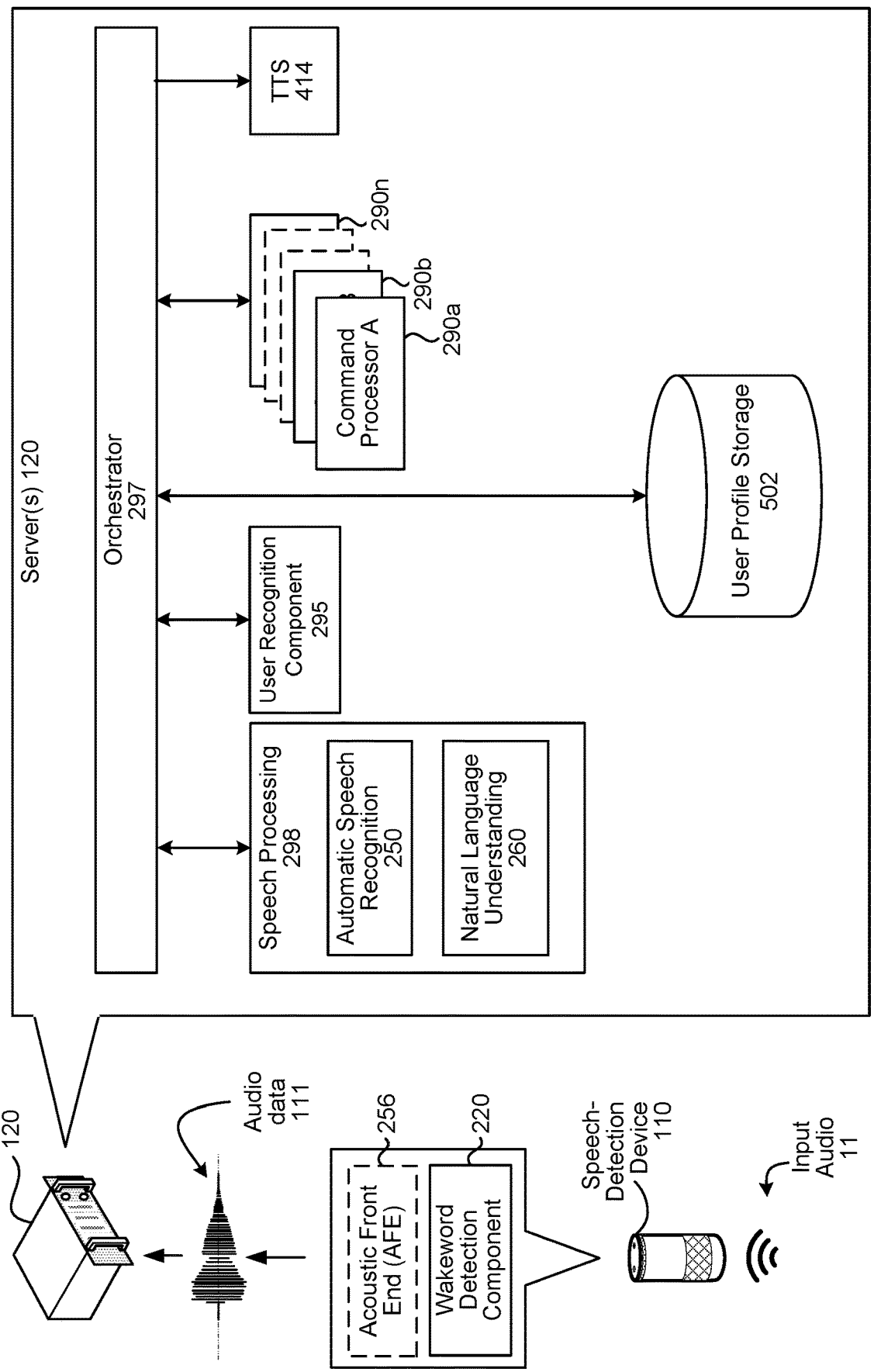
FIG. 2A is a diagram of components of a speech processing system according to embodiments of the present disclosure.
Figure 2B:
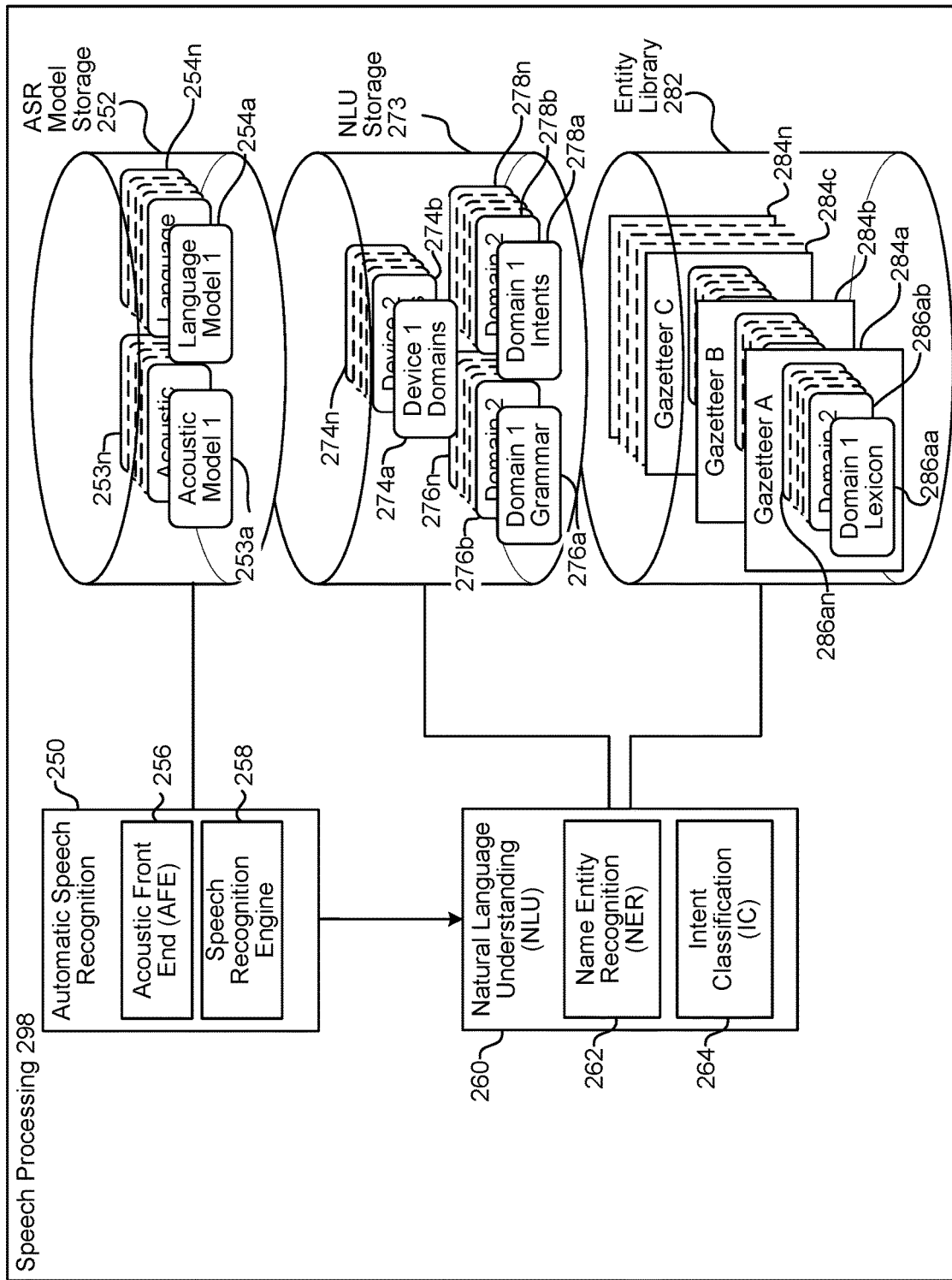
FIG. 2B is a diagram of components of a speech processing system according to embodiments of the present disclosure.

The system 100 of FIGS. 1A and 1B may operate using various speech processing components as described in FIGS. 2A and 2B. The various components illustrated may be located on a same or different physical devices. Communication between various components illustrated in FIGS. 2A and 2B may occur directly or across a network(s) 199. An audio capture component, such as a microphone (or array of microphones) of the speech-detection device 110 (or other device), captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120 for processing. The audio data 111 may be output from an acoustic front end (AFE) 256 located on the speech-detection device 110 prior to transmission, or the audio data 111 may be in a different form for processing by a remote AFE 256, such as the AFE 256 located with an ASR component 250 of the server(s) 120.

The wakeword detection component 220 works in conjunction with other components of the speech-detection device 110, for example a microphone to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

The speech-detection device 110 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the speech-detection device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in audio data.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, or semantic analysis. Instead, audio data is analyzed to determine if specific characteristics of the audio data match preconfigured acoustic waveforms, audio signatures, or other data to determine if the incoming audio data "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without HAIM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected in the audio data, the speech-detection device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the speech-detection device 110 prior to sending the audio data 111 to the server(s) 120.

Upon receipt by the server(s) 120, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., an ASR model storage 252). For example, the ASR component 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text data corresponding to the audio data 111. The ASR component 250 may also output multiple hypotheses in the form of a lattice or an N-best list with each hypothesis corresponding to a confidence score or other score (e.g., such as probability scores, etc.).

The server(s) 120 including the ASR component 250 may include an AFE 256 and a speech recognition engine 258. The AFE 256 transforms audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-detection device 110 may process audio data 111 into feature vectors (e.g., using an on-device AFE 256) and transmit the feature vector data to the server(s) 120, across the network(s) 199, for ASR processing. Feature vector data may arrive at the server(s) 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 258 to the orchestrator 297 or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 either directly or indirectly through the orchestrator component 297.

The device performing NLU processing (e.g., the server(s) 120) may include various components, including potentially dedicated processor(s), memory, storage, etc. The device performing NLU processing may include a dedicated NLU component 260, which may include a named entity recognition (NER) component 262 and an intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways. Domain, as used herein, may refer to a category of content, such as music, videos, weather, etc.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-detection device 110, the server(s) 120, server communication router 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," the NLU component 260 may tag "call" as a command (e.g., to execute a phone call) and may tag "mom" as a specific entity and target of the command. In addition, the telephone number for the entity corresponding to "mom" stored in a contact list may be included in the annotated NLU results.

To correctly perform NLU processing of an utterance, the NLU component 260 may be configured to determine a "domain" of the utterance so as to determine and narrow down which services offered by an endpoint device (e.g., the server(s) 120, the speech-detection device 110, a communication router 125, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-detection device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance may be NLU processed using the grammar models and lexical information for communications, and may also be processed using the grammar models and lexical information for music. The responses to the spoken utterance produced by each set of models is scored, with the overall highest ranked result from all applied domains being ordinarily selected to be the correct result.

The IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HIVIMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazetteer for similarity with the framework slots. So a framework for a "play music" intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-detection device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may also be sent to a user recognition component 295 either directly or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 2 may also include a confidence component that determines an overall confidence as the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, etc., and output of the user recognition component 295 (e.g., a unique ID of a user) may be sent to a command processor 290, which may be located on a same or separate server 120 as part of the system 100. The system 100 may include more than one command processor 290, and the command processor(s) 290 may be determined based on the NLU output. For example, if the NLU output includes a command to play music, the command processor 290 selected may correspond to a music playing application, such as one located on the speech-detection device 110 or in a music playing appliance. Many such command processors 290 may be available to the system 100 depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Output from the NLU component 260 (and optionally the user recognition component 295) may be sent to a command processor(s) 290/skill either directly or indirectly via the orchestrator component 297. A "skill" may correspond to a domain and may be software running on a server or device akin to an application. That is, a skill may enable a server(s) 120 to execute specific functionality in order to provide data or produce some other output called for by a user. The system may be configured with more than one skill. For example a weather service skill may enable the server(s) 120 to execute a command with respect to a weather service server, a car service skill may enable the server(s) 120 to execute a command with respect to a taxi service server, an order pizza skill may enable the server(s) 120 to execute a command with respect to a restaurant server, etc.

The server(s) 120 may include a communication manager command processor(s) 290. The communication manager command processor(s) 290 may be configured to perform various steps described herein with respect to message generation and transmission.

The NLU operations described herein may take the form of a multi-domain architecture, such as that illustrated in FIG. 3. In the illustrated architecture, each domain (which may include a set of intents and entity slots that define a larger concept such as music, video, messaging, etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the multi-domain architecture may consist of multiple domains for intents/commands executable by the system 100 (or by other devices connected to the system 100), such as music, video, messaging, and information. The NLU component 260 may include a plurality of domain recognizers 335, where each domain may include its own recognizer 263. Each recognizer 263 may include various NLU components such as an NER component 262, IC component 264, and other components such as an entity resolver, etc.

For example, a music domain recognizer 263-A may have an NER component 262-A that identifies what slots (i.e., portions of input text data) may correspond to particular words relevant to the music domain. The slots may correspond to entities such as (for the music domain) a performer, album name, song name, etc. An NER component 262 may use a machine learning model, such as a domain specific conditional random field (CRF) to both identify the portions of text data corresponding to an entity as well as identify what type of entity corresponds to the text portion. For example, for the text "play songs by the stones," an NER component 262-A trained for a music domain may recognize the portion of text "the stones" corresponds to an entity and an artist name. The music domain recognizer 263-A may also have its own IC component 264-A that determines the intent of the utterance represented in the text data, assuming that the text data is within the proscribed domain. An IC component 264 may use a model, such as a domain specific maximum entropy classifier to identify the intent of the utterance, where the intent is the action the user desires the system to perform.

As illustrated in FIG. 3, multiple domains may operate substantially in parallel, with different domain specific components. That is, domain B for video may have its own recognizer 263-B including NER component 262-B and IC component 264-B. Domain C for messaging may also have similar components in its recognizer 263-C, and so on for the different domains available to the system 100. When text data 300 (e.g., ASR output text data) is received, the same text data that is input into the NLU pipeline for domain A 263-A may also be input into the NLU pipeline for domain B 263-B, where the components for domain B 263-B will operate on the text data 300 as if the text data 300 related to domain B, the components for domain C 263-C will operate on the text data 300 as if the text data 300 related to domain C, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, etc.). The recognizers 335 may operate using machine learning trained models such as a CRF, maximum entropy classifier, neural network (such as a deep neural network (DNN) or recurrent neural network (RNN), or other classifier. The recognizers 335 may also use rules that operate on input text data in a particular form to identify named entities and/or intents. The recognizers 335 may also operate using a data structure such as a finite state transducer (FST) to process the text data 300 to perform NER and/or IC. Other techniques or models may also be used to perform NER and/or IC. The techniques may also be used together. For example, a set of rules, an FST, and a trained machine learning model may all operate on text data 300 substantially in parallel to determine the named entities/intents of an utterance represented in the text data 300. If one technique performs its task with high enough confidence, the system may use the output of that technique over the others. The system may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the utterance represented in the text data 300.

The output of each recognizer may be an N-best list of intents and slots representing the particular recognizer's top choices as to the meaning of the utterance represented in the text data 300, along with scores for each item in the N-best list. For example, for text data 300 of "tell John I said have fun," the messaging domain recognizer 263-C may output an N-best list in the form of:

[0.95] SeenMessageIntent RecipientName: John Smith
[0.02] SendMessageIntent RecipientName: John Kaplan
[0.01] SendMessageIntent RecipientName: John Deere
[0.01] SendMessageIntent RecipientName: John Baker where the NER component 262-C of recognizer 263-C has determined that for different items in the N-best list the word "John" corresponds to a slot. The IC component 264-C of recognizer 263-C has also determined that the intent of the utterance represented in the text data 300 is a SendMessageIntent (and selected that as the intent for each item on the messaging N-best list). The recognizer 263-C also determined a score for each item in the list representing the recognizer's confidence that the particular item is correct. As can be seen in the example, the top item has the highest score. Each recognizer of the recognizers 335 may operate on the text data 300 substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER (e.g., identify words of the input text data 300 that are important for downstream processing (sometimes called light slot filling), and may even label those words according to type (such as artist name, album name, city, or the like)), the recognizers 335 may not perform entity resolution (i.e., determining the actual entity corresponding to the words of the text data 300). Entity resolution is typically a higher latency process and involves communications with a knowledge base 272 or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 of all the domains may be passed to a cross domain processing component 355, which may further rank the individual items in the N-best lists 340 as well as perform other operations.

The cross domain processing component 355 may include a cross-domain ranker 350. The cross-domain ranker 350 takes the N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example text data 300 of "play the hunger games." The text data 300 may be processed by each of the recognizers 335, and each will output an N-best list, resulting in the group of N-best lists 340 input into the cross domain processing component 355. The cross-domain ranker 350 may then rank the individual items among the N-best lists to create a new N-best list. For example, the cross-domain ranker 350 may output an N-best list in the form of:

[0.78] Messaging SendMessageIntent RecipientName: John
[0.13] Video ReadBookIntent BookName: John
[0.07] Music PlayMusicIntent AlbumName: John where the top items from different N-best lists from multiple domains are grouped into a single N-best list 360. As shown, the top scoring item is from the messaging domain 263-C, includes the intent "sendmessageintent" and a slot labeled as recipient name corresponding to the text "John." The next item is from the video domain 263-B, includes the intent "readbookintent" and a slot labeled as book name corresponding to the text "John." Each item in the cross-domain N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler component 352 can take text from slots and alter it to make the text more easily processed by downstream components. The operations of the light slot filler component 352 are typically low latency operations that do not involve heavy operations, such as those that require referencing a knowledge base. The purpose of the light slot filler component 352 is to replace words with other words or values that may be more easily understood by downstream components. For example, if the text data 300 includes the word "tomorrow," the light slot filler component 352 may replace the word "tomorrow" with an actual date for purposes of downstream processing. Similarly, a word "CD" may be replaced by a word "album." The replaced words are then included in the cross domain N-best list 360.

The cross-domain N-best list 360 is output to a heavy slot filler and entity resolver 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The entity resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user utterance). In the example "play songs by the stones," the entity resolver 370 may reference to a personal music catalog, Amazon Music account, user profile 404, or the like. The output from the entity resolver 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components or pipeline or may be on a separate device in communication with the system. While illustrated as a cross-domain resolver, multiple entity resolvers 370 may exist where a particular entity resolver 370 may be specific for one or more domains.

As can be appreciated, the entity resolver 370 may not necessarily be successful in resolving every entity and filling every slot. This may result in incomplete results in the combined N-best list. A final ranker 390 may consider such errors when determining how to rank the ultimate results for potential execution. For example, if an item of the cross-domain N-best list 360 comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 263, cross domain processing component 355, or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input utterance, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may include application rating or popularity data. For example, if one application has a particularly high rating, the final ranker 390 may increase the score of results associated with that particular application. The other data 391 may also include information about applications that have been specifically enabled by the user (as indicated in a user profile 404, discussed in reference to FIG. 4). NLU results from enabled applications may be scored higher than results from non-enabled applications. User history may also be considered, such as if the user regularly uses a particular application or does so at particular times of day. Date, time, location, weather, type of device 110, user ID, context, and other information may also be considered. For example, the final ranker 390 may consider when any particular applications are currently active (such as music being played, a game being played, etc.). The highest scoring result (or results in the case of multiple commands being in an utterance) may be passed to a downstream command processor 290 for execution.

Following final ranking, the NLU component 260 may output NLU output data 385. The NLU output data 385 may include an indicator of the intent of the utterance along with data associated with the intent, for example an indication that the intent is "play music" and the music to be played is "Adele." The NLU output data 385 may be in the form of previous NLU data such as an item(s) in the N-best lists 340, an item(s) in the cross-domain N-best list 360, or the like. The NLU output data 385 may also be in a format executable by the command processor 290. Multiple instances of NLU output data (e.g., 385a-385n) may also be output.

Figure 4:
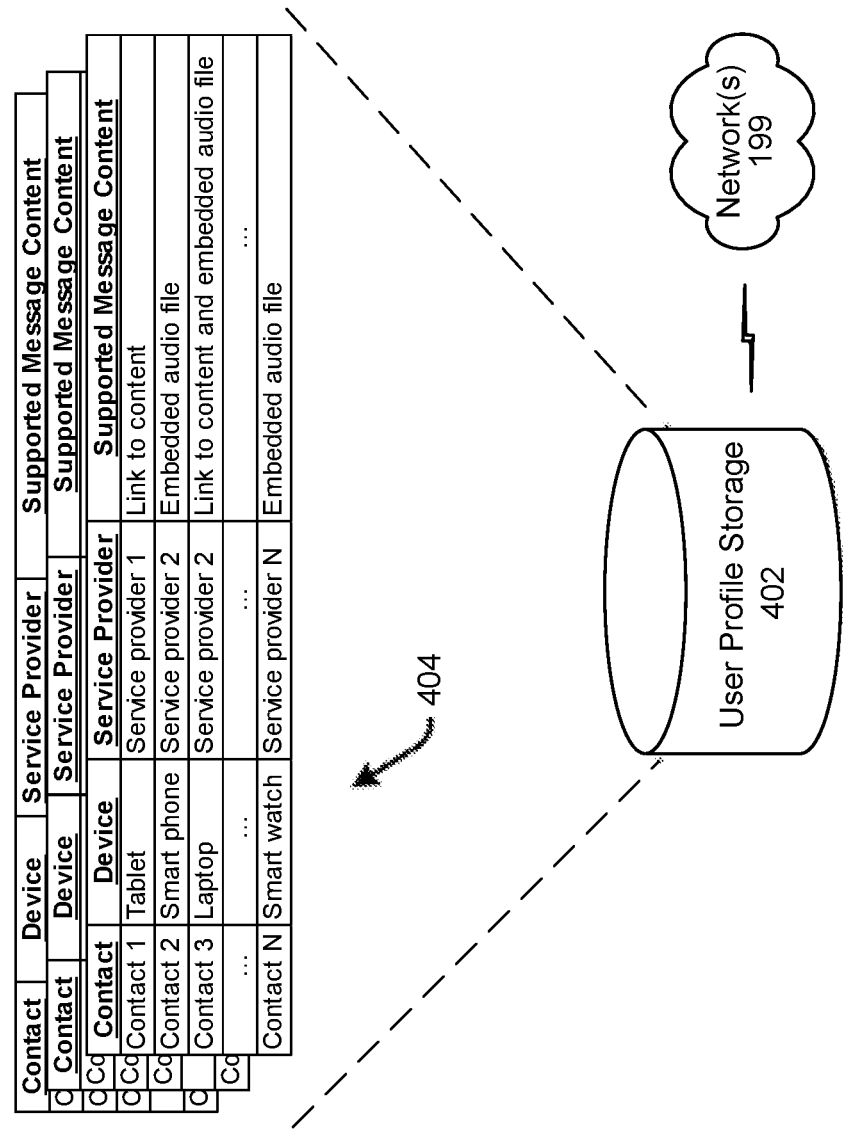
FIG. 4 illustrates data stored and associated with user profiles according to embodiments of the present disclosure.

FIG. 4 illustrates a user profile storage 402 that includes data regarding user accounts 404. The user profile storage 402 may be located proximate to the server(s) 120, or may otherwise be in communication with various components, for example over the network(s) 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as names of contacts. Each contact may be associated with one or more devices, and each device may be associated with a respective service provider (e.g., a telephony and messaging service provider/carrier). Moreover, each contact device may be associated with data indicating the types of messaging supported by the device. In addition, each service provider/carrier may be associated with data indicating the types of messaging supported by the service provider/carrier.

Figure 5:
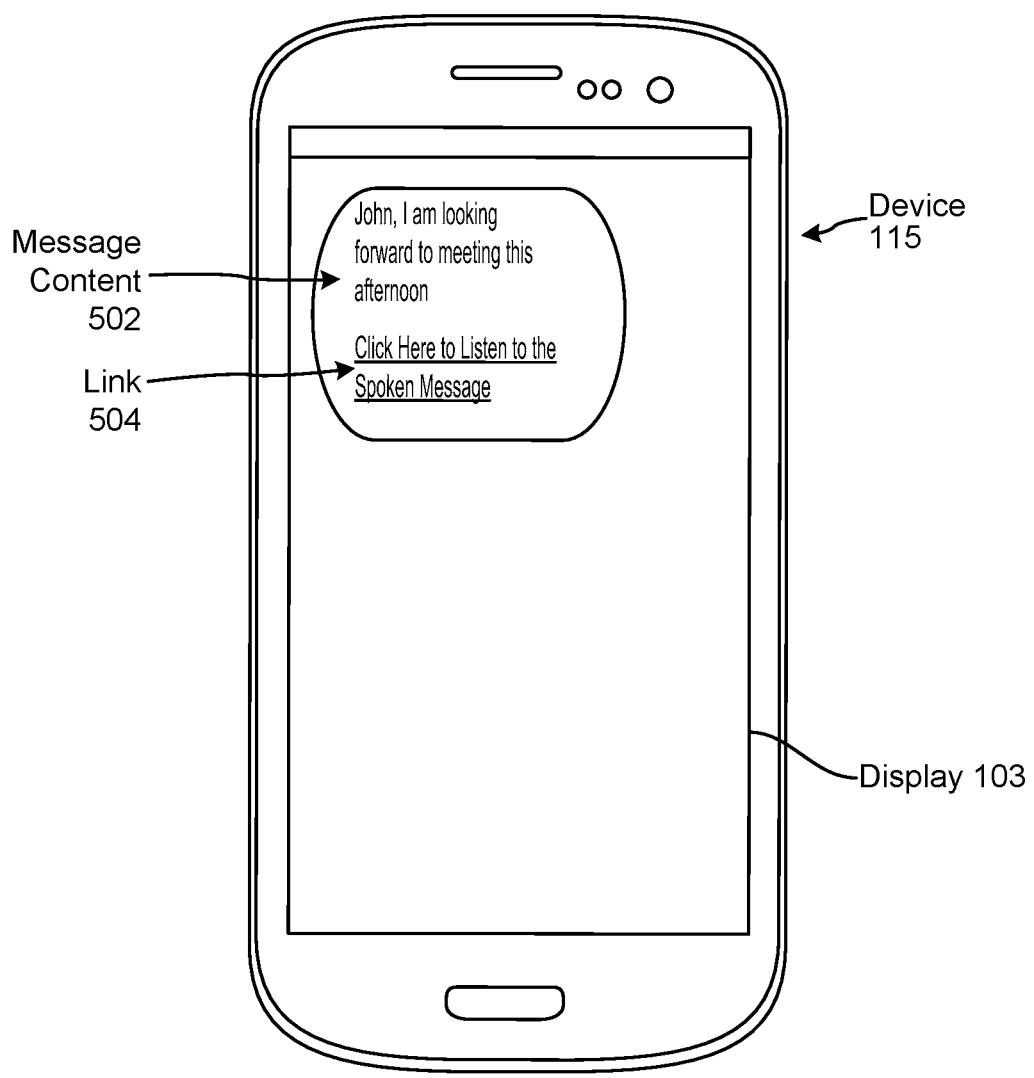
FIG. 5 illustrates an example of how a message payload including a link to message content audio data may be displayed according to embodiments of the present disclosure.

FIG. 5 illustrates an example of how a message payload including a link to message content audio data may be displayed. The recipient device 115 may include a display 103 that presents message payloads as well as other content. The display 103 may present a SMS message including message content 502 in the form of text. The same message may also include a link 504. The link may be text, an icon, or any other type of visual data that may operate as a link.

FIGS. 6A through 6E illustrate the generation of a message payload including a link to message content audio data. A device 110 receives (602) audio corresponding to a spoken utterance. The device 110 generates audio data corresponding to the audio, and sends (604) the audio data to a server(s) 120 for further processing.

The server(s) 120 performs (606) ASR on the audio data to generate text data, and performs (608) NLU on the text data to determine NLU results. The server(s) 120 may determine (610), based on the NLU results, an intent to send a message. For example, for text data corresponding to "tell John I am excited to have coffee with you this afternoon," the server(s) 120 may determine the utterance corresponds to a "sendmessageintent."

The server(s) 120 may determine (612), based on the NLU results, a name of an intended recipient of the message. For example, for text data corresponding to "tell John I am excited to have coffee with you this afternoon," the server(s) 120 may determine "John" as the intended recipient.

The server(s) 120 may identify (614) a user that spoke the utterance. Identifying the user may involve processes detailed with respect to the user recognition component 295 discussed above. Identifying the user may also include the system prompting the user to speak user identifying information, such as the user's name, user's system unique ID, etc. The server(s) 120 may also determine (616), in a profile associated with the user, information identifying the intended recipient. For example, if the intended recipient is "John," the server(s) 120 may determine text corresponding to "John" in a contact/recipient column of the profile. The contact/recipient column may be associated with further recipient information such as device unique ID (e.g., phone number), etc.

The profile of the user may include contacts/recipients from various systems. For example, the contacts represented in the user's profile may be imported from a service provider server(s) 125 through which the user has an account and contact list. The server(s) 120 may determine (134) the recipient has not enabled direct audio messaging functionalities of the system. That is, the server(s) 120 may determine the recipient's device is unable to receive message content corresponding partially or solely to a portion of the input audio data. Such determination may be based on the type of recipient device, the service provider associated with the recipient device (as service providers may have different messaging bandwidths), etc. Moreover, the server(s) 120 may determine the recipient's device is unable to receive message content by accessing a profile associated with a unique identifier (e.g., phone number) of the recipient device and determining that the profile is missing a direct audio messaging identifier. The server(s) 120 may also determine a messaging capability of the recipient's device (which may be determined by what kind of device type the recipient's device is e.g., phone, table, speech-controlled device, etc.) and, based on the messaging capability, may determine to send the recipient's device a link to the audio content rather than a direct audio message. For example, the server(s) 120 may determine the recipient's device is configured to (e.g., capable of) receive SMS messages, and may cause the recipient's device to be sent (either directly from the server(s) 120 or through another routing device) an SMS message (e.g., a text-based message) including a link to the audio of the original spoken message. In another example, the server(s) 120 may determine the recipient's device is configured to (e.g., capable of) receiving MMS messages (e.g., an enhanced, but still text-based message) and may cause the recipient's device to be sent (either directly from the server(s) 120 or through another routing device) an MMS message including text and audio of the original spoken message. In another example, the server(S) 120 may determine the recipient's device is configured to (e.g., capable of) receiving a direct audio message (e.g., a message with the audio data of the message but without necessarily including text data of the message content) and may thus send the recipient's device (either directly or after being prompted to do so, a direct audio message including the audio data of the message content).

In some instances, the system may not identify the user that spoke the utterance. Rather, the system may determine the intended recipient from the user utterance and make an assumption thereon as to who the user that spoke the utterance was. That is, the system may determine the intended recipient from the user utterance and attempt to determine the intended recipient in contact lists associated with the device that captured the utterance. Each device may be associated with various users and user profiles. If the system determines the intended recipient in a contact list associated with the device, the system assumes the user associated with that profile is the user that spoke the utterance.

The server(s) 120 may determine (622), based on the NLU results, a portion of the audio data corresponding to message content. The portion of the audio data may start with a first word of the spoken message content and end with a last word of the spoken message content. This enables a text of a text message generated by transcribing the portion of the audio data to corresponding solely to the message content. For example, for audio data corresponding to "tell John I am excited to have coffee with you this afternoon," the server(s) 120 may determine message content audio data corresponding to "I am excited to have coffee with you this afternoon." The server(s) 120 may store (624) message content audio data corresponding to the portion of the audio data corresponding to the message content. The message content audio data may be stored in a buffer that deletes the message content audio data after a determined duration of time, for example a few hours after the message content audio data is stored to the buffer.

The server(s) 120 may generate (626) message payload data including text corresponding to content of the message (e.g., as determined from the NLU results) as well as a link to the message content audio data. The text in the message payload data may be a transcription of all or a part of the spoken message content. The text in the message payload data may alternatively correspond to an indication that the recipient has received a voice message. For example, such text may correspond to "you have received a voice message from John, click the below link to hear the message." The link may be tokenized. Tokenization of the link may cause the link to expire after a determined time period, for example a few hours to a day after the link is created. To tokenize the link, a hashed value may be created for the message content audio data, with the hashed value being unique to the message content audio data, the user ID of the user that spoke the message, and the time the audio data was received by the server(s) 120. The message payload data may further include an API instruction. The API instruction may be formatted based on the type of the recipient device and/or the carrier associated with the recipient device.

The server(s) 120 sends (628) message payload data and recipient device ID data (e.g., phone number), and the hashed value if the link is tokenized, to the communication router device(s) 125. As detailed above, the communication router device(s) 125 may be a mobile device associated with the same profile as the device 110 or may be a service provider server(s). The service provider server(s) 125 receives the message payload data and recipient device ID from either the SMS application executed by the message sender's mobile device or the server(s) 120, and sends (630) the message payload data, and the hashed value if the link is tokenized, to the recipient device 115.

The recipient device 115 displays (632) the message payload. The recipient device 115 may receive (634) an indication to activate a displayed link of the message payload. Receiving the indication may include detecting a touch contact at a location of a touch-sensitive interface of the device 115 displaying the link. In response to the indication, the recipient device 115 may send (636) a signal requesting activation of the link, and the hashed value if the link is tokenized, to the communication router device(s) 125. If the communication router device(s) 125 is the companion application, the signal requesting activation of the link, and optionally the hashed value, may be sent from the device 115 to the SMS application executing on the same device as the companion application, and the companion application can receive the signal and optionally the hashed value from the SMS application. The communication router device(s) 125 sends (638) the signal, and the hashed value if the link is tokenized, to the server(s) 120.

The server(s) 120 determines (640), based on the signal and optionally the hashed value, the message content audio data. The server(s) 120 then sends (642) the message content audio data to the communication router device(s) 125. The communication router device(s) 125 sends (644) the message content audio data to the recipient device 115 either indirectly via the SMS application or directly depending on whether the communication router device(s) is the message sender's mobile device or a service provider server(s) associated with the recipient's device. The recipient device outputs (646) audio corresponding to the message content audio data.

The server(s) 120 may send an entirety of the message content audio data to the communication router device(s) 125 as a single packet of data. Alternatively, the server(s) 120 may stream the message content audio data to the communication router device(s) 125. That is, the server(s) 120 may transmit the message content audio data to the communication router device(s) over the network(s) 199 as a steady, continuous flow. The communication router device(s) may forward message content audio data to the recipient device 115 as the communication router device(s) 125 receives the message content audio data, thereby allowing playback of the message content audio data to proceed at the recipient device 115 as subsequent message content audio data is received by the communication router device(s) 125 and forward therefrom to the recipient device 115.

Figure 7:
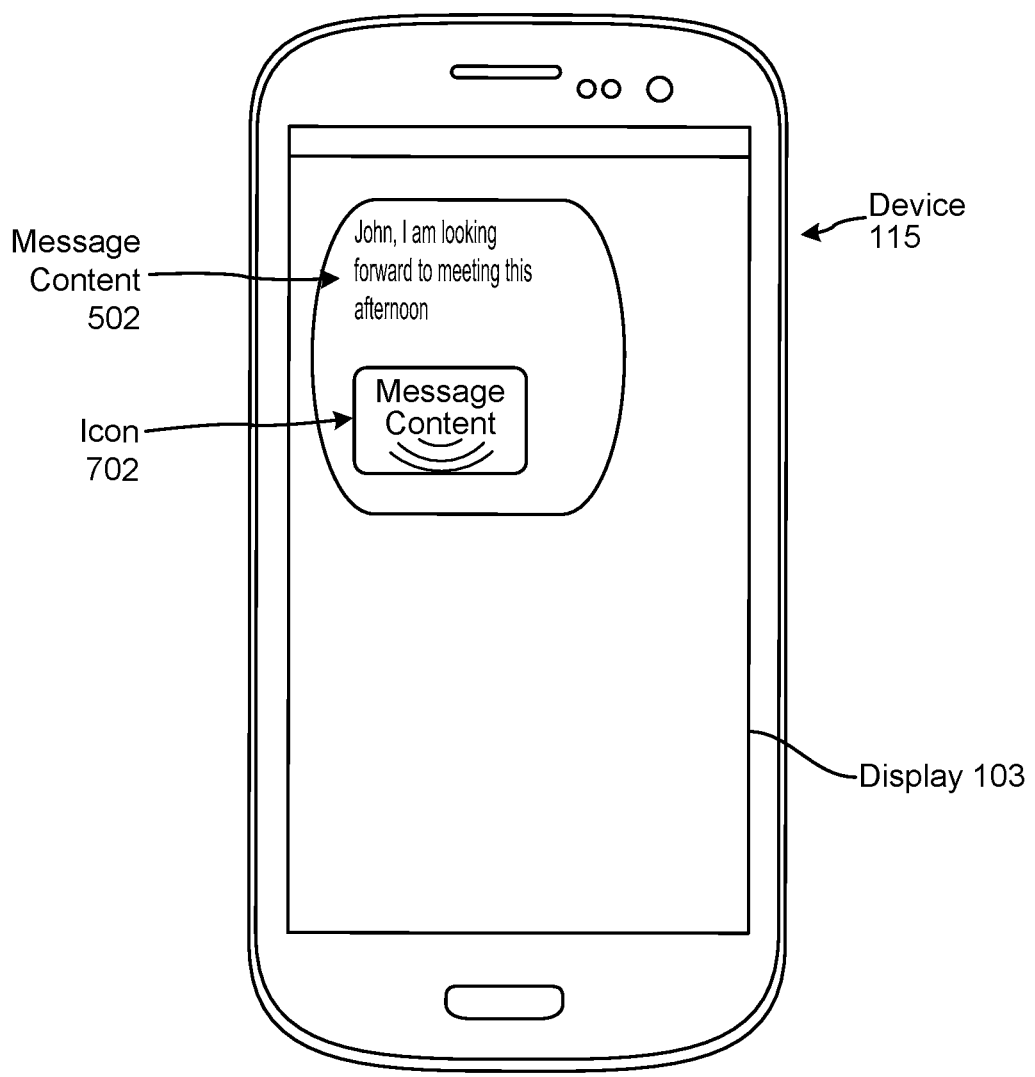
FIG. 7 illustrates an example of how a message payload including embedded message content audio data may be displayed according to embodiments of the present disclosure.

FIG. 7 illustrates an example of how a message payload including embedded message content audio data may be displayed. The recipient device 115 may include a display 103 that presents message payloads as well as other content. The display 103 may present a MMS message including message content 602 in the form of text. The same message may also include an icon 702 representing a link to embedded message content audio data. The icon may be of various shapes and sizes, and may include various shapes, colors, and text displayed thereon.

FIGS. 8A and 8B illustrate the generation of a message payload including embedded message content audio data. The first step of FIG. 8A (i.e., step 802 discussed below) follows step 622 represented in FIG. 6B. The server(s) 120 may generate (802) message content audio data corresponding to the portion of the audio data corresponding to the message content.

The server(s) 120 may generate (804) a message payload including text corresponding to content of the message's content (e.g., as determined from the NLU results) and embedded with the message content audio data. The server(s) 120 sends (628) message payload data and recipient device ID data (e.g., phone number) to the communication router device(s). As detailed above, the communication router device(s) 125 may be a mobile device associated with the same profile as the device 110 or may be a service provider server(s). The service provider server(s) 125 receives the message payload data and recipient device ID from either the SMS application executed by the message sender's mobile device or the server(s) 120, and sends (630) the message payload data to the recipient device 115.

The recipient device 115 displays (632) the message payload. The recipient device 115 may receive (806) an indication to activate the embedded message content audio data. Receiving the indication may include detecting a touch contact at a location of a touch-sensitive interface of the device 115 displaying an icon indicating the message content audio data. In response to the indication, the recipient device 115 outputs (808) audio corresponding to the embedded message content audio data.

As indicated with respect to FIGS. 6A through 6E and 8A through 8D, the server(s) 120 may determine the type of message payload supported by the recipient device. Alternatively, the audio data corresponding to the utterance of the user may indicate the type of message payload that should be used. For example, if an utterance corresponds to "send John a SMS stating I am excited to meet for coffee this afternoon," the server(s) 120 may determine to use a SMS message payload including a link to message content audio data. For further example, if an utterance corresponds to "send John a MMS stating I am excited to meet for coffee this afternoon," the server(s) 120 may determine to use a MMS message payload embedded with message content audio data.

Moreover, rather than determine the type of message payload supported by the recipient device, the server(s) 120 may determine the type of message payload to use based on user history with respect to the specific recipient. For example, once the identity of the recipient is determined, the server(s) 120 may analyze past messaging interactions between the user and the recipient in order to determine the type of message payload to use for the current message. Thresholding may be implemented with this embodiment to prevent incorrect message payload types to be used. For example, the server(s) 120 may be configured to use the past interactions of the user and the recipient as an indicator of the type of message payload to use only if a specific type of message payload was used a threshold amount of times or more in the past interactions. The threshold may be configured as a percentage, and may be configured based on the system's accuracy requirements. For example, one system may use past interactions as an indicator of the type of message payload to use if the past interactions indicate a single type of message payload was used 75% or more of the time, a second system may use past interaction as an indicator if the past interactions indicate a single type of message payload was used 90% or more of the time, etc. The system may also require a certain amount of past messaging interactions prior to using this method in order to obtain a certain level of confidence that past actions foreshadow future actions. If the threshold of the system is not satisfied, the server(s) may then determine the type of message payload based on capabilities of the recipient device and/or associated service provider server as described herein.

A given recipient device and/or associated service provider server may support both MMS and SMS message payloads. To account for such, the system may be configured to prefer one type of message payload over the other depending on the recipient device or user preferences, service provider, etc. Alternatively, when this situation arises, the system may prompt the user that spoke the message to solicit the type of message the user would like to send.

The type of application from which the message originates may dictate the type of message payload used. For example, if the application is a SMS based application, the system may determine to use a SMS payload. For further example, if the application is a MMS based application, the system may determine to use a MMS payload.

Figure 9:
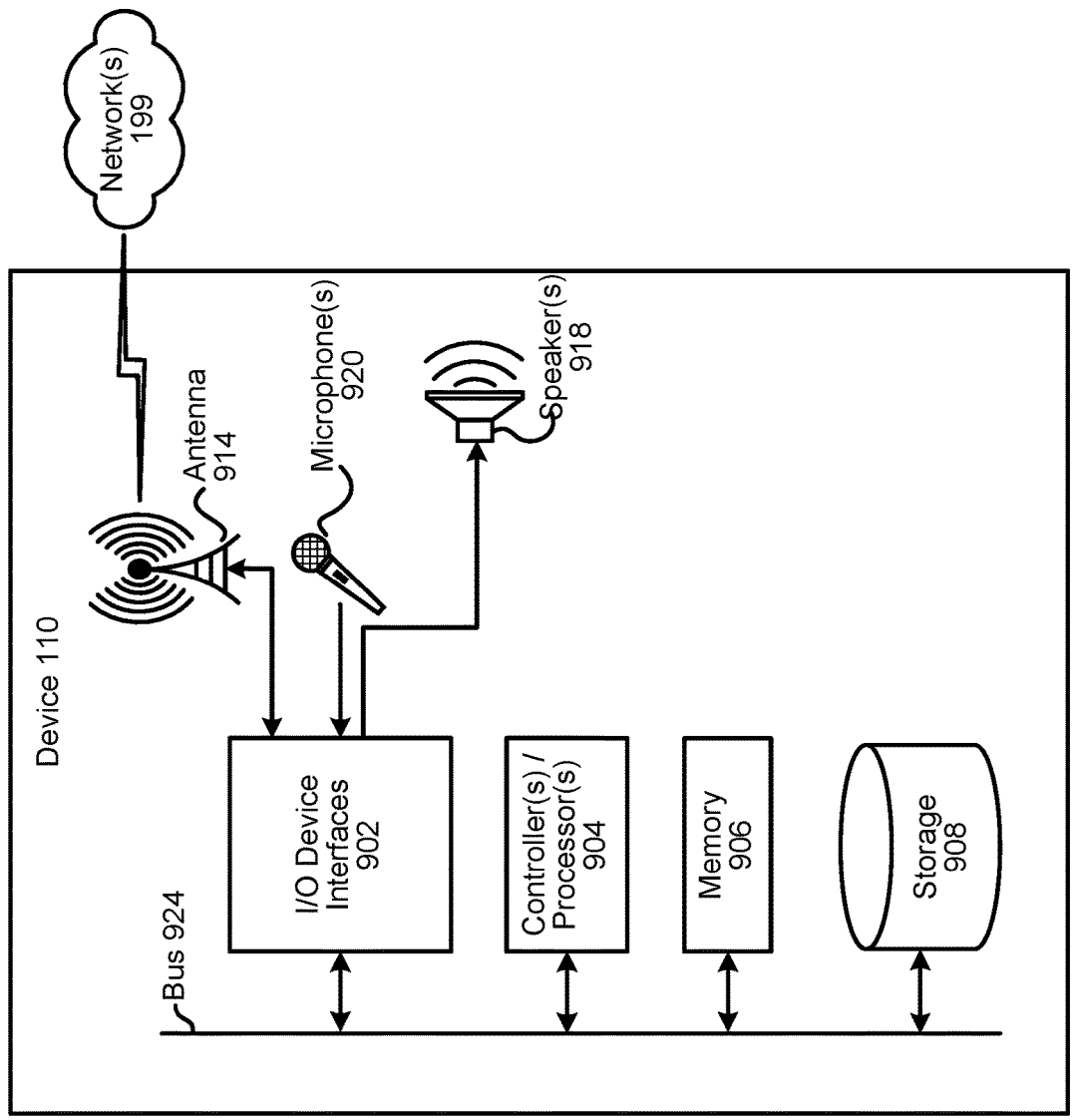
FIG. 9 is a block diagram conceptually illustrating example components of a speech-detection device according to embodiments of the present disclosure.
Figure 10:
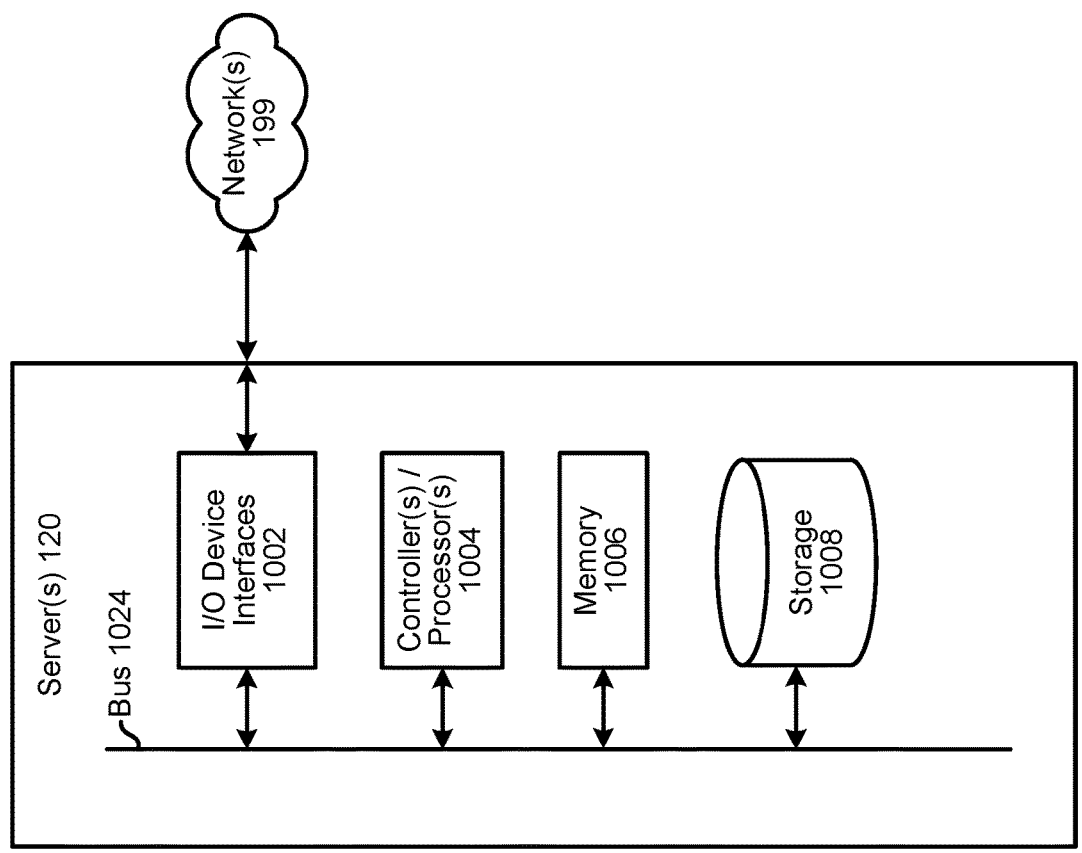
FIG. 10 is a block diagram conceptually illustrating example components of a server according to embodiments of the present disclosure.

FIG. 9 is a block diagram conceptually illustrating a user device, such as the device 110, that may be used with the described system 100. FIG. 10 is a block diagram conceptually illustrating example components of a remote device, such as the server(s) 120, which may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker(s) 918, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. The microphone(s) 920 may be configured to capture audio. If an array of microphones 918 is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

As noted above, multiple devices may be employed in a single speech processing system 100. In such a multi-device system, each of the devices may include different components for performing different aspects of the speech processing. The multiple devices may include overlapping components. The components of the device 110 and the server(s) 120, as illustrated in FIGS. 9 and 10, are exemplary, and may be located as a stand-alone device or may be included, in whole or in part, as a component of a larger device or system.

Figure 11:
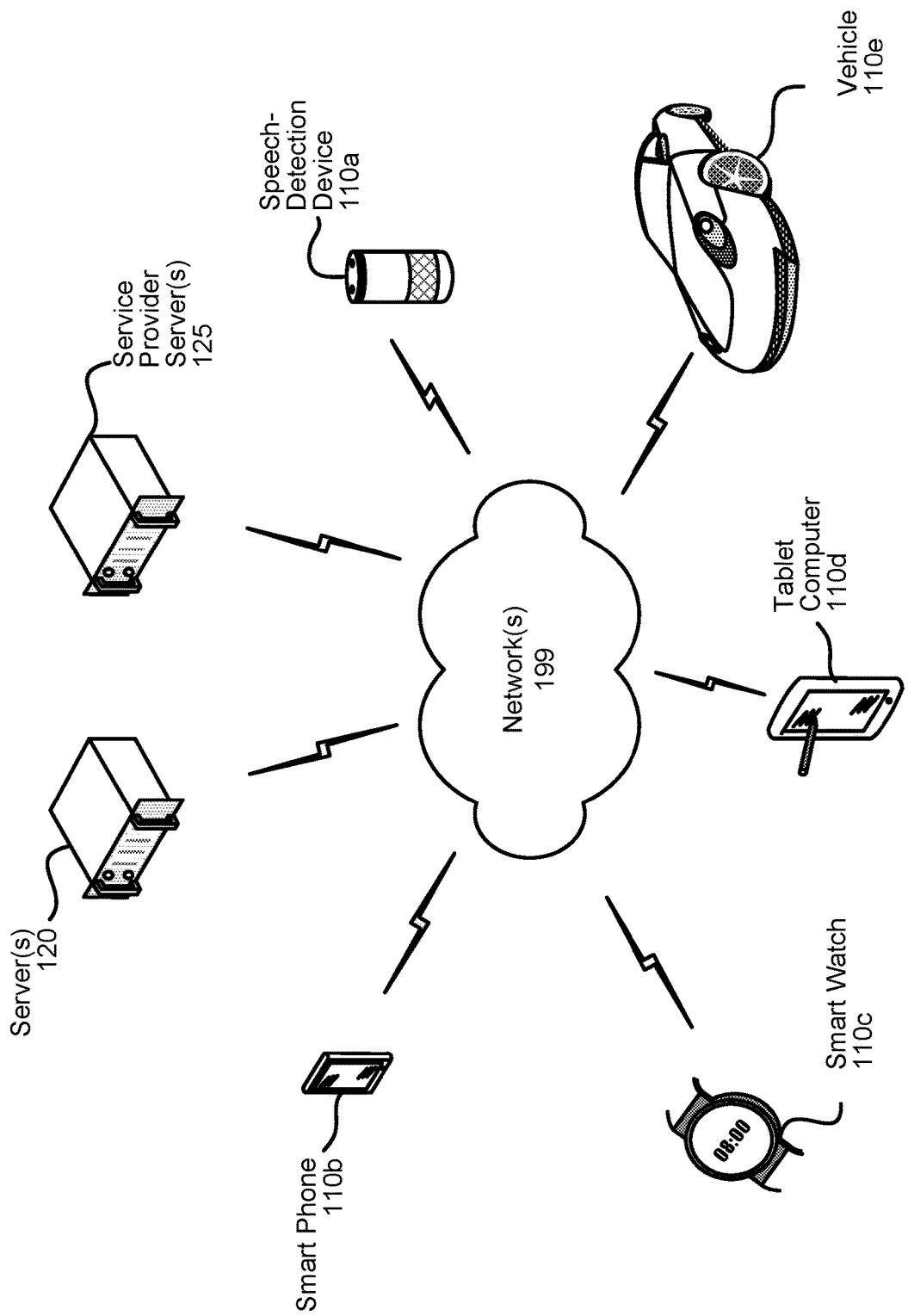
FIG. 11 illustrates an example of a computer network for use with the speech processing system.

As illustrated in FIG. 11, multiple devices (110a-110e, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, and/or a vehicle 110e may be connected to the network(s) 199 through a wireless service provider, over a WiFi or cellular network connection, or the like. Other devices are included as network-connected support devices, such as the server(s) 120, the service provider server(s) 125, or others. The support devices may connect to the network(s) 199 through a wired connection or wireless connection. Networked devices may capture audio using one-or-more built-in or connected microphones or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, from a first device, first audio data representing first speech;
   determining, from among a plurality of natural language understanding (NLU) intents, that the first speech corresponds to a first NLU intent to send a message to a recipient user;
   based at least in part on the first speech corresponding to the first NLU intent, determining the message is to be sent to a recipient device as audio data;
   determining a second device associated with the recipient user;
   determining the second device is associated with a first message service provider;
   based at least in part on the second device being associated with the first message service provider, determining the second device is configured to receive a first message including a hyperlink and text;
   storing a portion of the first audio data corresponding to message content;
   generating a first hyperlink associated with the portion of the first audio data;
   generating first message payload data including the first hyperlink and first text data corresponding to a transcription of the portion of the first audio data; and
   sending the first message payload data to at least one server associated with the first message service provider.

2. The method of claim 1, further comprising:
   determining a user profile associated with the first audio data;
   determining a third device associated with the user profile; and
   sending the first message payload data to a first application executed by the third device, the first application configured to cause the first message payload data to be sent to a message application executed by the third device.

3. The method of claim 1, further comprising:
   receiving, from the first device, second audio data representing second speech;
   determining, from among the plurality of NLU intents, that the second speech corresponds to the first NLU intent;
   based at least in part on the second speech corresponding to the first NLU intent, determining a second message is to be sent to a second recipient device as third audio data;
   determining a third device to output the second message;
   determining the third device is associated with a second message service provider;
   based at least in part on the third device being associated with the second message service provider, determining the second message is to include text and an embedded audio file;
   generating second message payload data including:
      a portion of the second audio data corresponding to the second message, and
      second text data corresponding to a transcription of the portion of the second audio data; and
   sending the second message payload data to at least one server associated with the second message service provider.

4. The method of claim 1, further comprising:
   determining a profile associated with the second device; and
   determining the profile represents the second device is associated with the first message service provider.

5. The method of claim 1, further comprising:
   receiving a signal requesting activation of the first hyperlink, the signal originating from the second device; and
   causing the portion of the first audio data to be sent to the second device.

6. The method of claim 1, further comprising:
   determining previous messaging interactions between the first device and the second device,
   wherein the second device is further determined to be configured to receive the first message as including a hyperlink and text based at least in part on the previous messaging interactions.

7. A system, comprising:
   at least one processor; and
   at least one memory including instructions that, when executed by the at least one processor, cause the system to:
      receive, from a first device, first audio data representing first speech;

determine, from among a plurality of natural language understanding (NLU) intents, that the first speech corresponds to a first NLU intent to send a message to a recipient user;

based at least in part on the first speech corresponding to the first NLU intent, determine the message is to be sent to a recipient device as audio data;

determine a second device associated with the recipient user;

determine the second device is associated with a first message service provider;

based at least in part on the second device being associated with the first message service provider, determine the second device is configured to receive a first message including a hyperlink and text;

store a portion of the first audio data corresponding to message content;

generate a first hyperlink associated with the portion of the first audio data;

generate first message payload data including the first hyperlink and first text data corresponding to a transcription of the portion of the first audio data; and send the first message payload data to at least one server associated with the first message service provider.

8. The system of claim 7, wherein the at least one memory further includes instructions that, when executed by the at least one processor, further cause the system to:

receive a signal requesting activation of the first hyperlink, the signal originating from the second device; and cause the portion of the first audio data to be sent to the second device.

9. The system of claim 7, wherein the at least one memory further includes instructions that, when executed by the at least one processor, further cause the system to:

determine a second portion of the first audio data corresponding to an instruction for the first message payload data to include the first hyperlink and the first text data.

10. The system of claim 7, wherein the at least one memory further includes instructions that, when executed by the at least one processor, further cause the system to:

determine previous messaging interactions between the first device and the second device, wherein the second device is further determined to be configured to receive the first message as including a hyperlink and text based at least in part on the previous messaging interactions.

11. The system of claim 7, wherein the at least one memory further includes instructions that, when executed by the at least one processor, further cause the system to:

determine a user profile associated with the first audio data;

identify a third device associated with the user profile; and send the first message payload data to a first application executed by the third device, the first application configured to cause the first message payload data to be sent to a message application executed by the third device.

12. A method, comprising:

receiving, from a first device, first audio data representing first speech;

determining, from among a plurality of natural language understanding (NLU) intents, that the first speech corresponds to a first NLU intent to send a message to a recipient user;

based at least in part on the first speech corresponding to the first NLU intent, determining the message is to be sent to a recipient device as audio data;

determining a second device associated with the recipient user;

determining the second device is associated with a first message service provider;

based at least in part on the second device being associated with the first message service provider, determining the second device is configured to receive a first message including text and an embedded audio file;

determining a portion of the first audio data corresponding to message content;

generating first message payload data including the portion of the first audio data and first text data corresponding to a transcription of the portion of the first audio data; and sending the first message payload data to at least one server associated with the first message service provider.

13. The method of claim 12, further comprising:

receiving, from the first device, second audio data representing second speech;

determining, from among the plurality of NLU intents, that the second speech corresponds to the first NLU intent;

based at least in part on the second speech corresponding to the first NLU intent, determining a second message is to be sent to a second recipient device as third audio data;

determining a third device to output the second message;

determining the third device is associated with a second message service provider;

based at least in part on the third device being associated with the second message service provider, determining the second message is to include a hyperlink and text;

storing a portion of the second audio data corresponding to message content;

generating a first hyperlink associated with the portion of the first audio data;

generating second message payload data including the first hyperlink and second text data corresponding to a transcription of the portion of the second audio data; and sending the second message payload data to at least one server associated with the second message service provider.

14. The method of claim 12, further comprising:

determining previous messaging interactions between the first device and the second device, wherein the second device is further determined to be configured to receive the first message as including text and an embedded audio file based at least in part on the previous messaging interactions.

15. The method of claim 12, further comprising:

determining a user profile associated with the first audio data;

identifying a third device associated with the user profile; and sending the first message payload data to a first application executed by the third device, the first application configured to cause the first message payload data to be sent to a message application executed by the third device.

16. The method of claim 1, further comprising:
determining a second portion of the first audio data corresponding to an instruction for the first message payload data to include the first hyperlink and the first text data.

17. The system of claim 7, wherein the at least one memory further includes instructions that, when executed by the at least one processor, further cause the system to:
receive, from the first device, second audio data representing second speech;
determine, from among the plurality of NLU intents, that the second speech corresponds to the first NLU intent;
based at least in part on the second speech corresponding to the first NLU intent, determine a second message is to be sent to a second recipient device as third audio data;
determine a third device to output the second message;
determine the third device is associated with a second message service provider;
based at least in part on the third device being associated with the second message service provider, determine the second message is to include text and an embedded audio file;
generate second message payload data including:
a portion of the second audio data corresponding to the second message, and
second text data corresponding to a transcription of the portion of the second audio data; and
send the second message payload data to at least one server associated with the second message service provider.

18. The system of claim 7, wherein the at least one memory further includes instructions that, when executed by the at least one processor, further cause the system to:
determine a profile associated with the second device; and
determine the profile represents the second device is associated with the first message service provider.

19. The method of claim 13, further comprising:
receiving a signal requesting activation of the first hyperlink, the signal originating from the second device; and
causing the portion of the first audio data to be sent to the second device.

20. The method of claim 12, further comprising:
determining a profile associated with the second device; and
determining the profile represents the second device is associated with the first message service provider.

* * * * *